United States Patent
Scowen (10) Patent No.: US 9,578,958 B2
(45) Date of Patent: Feb. 28, 2017

(54) CARDBOARD CONSTRUCTION

(71) Applicants: FLUTE OFFICE LIMITED, Ockley, Surrey (GB); DS SMITH PACKAGING LIMITED, Maidenhead, Berkshire (GB)

(72) Inventor: Cheryl Louise Scowen, Maidenhead (GB)

(73) Assignees: FLUTE OFFICE LIMITED, Ockham Surrey (GB); DS SMITH PACKAGING LIMITED, London (GB)

(*) Notice: Subject to any disclaimer, the term of this patent is extended or adjusted under 35 U.S.C. 154(b) by 0 days.

(21) Appl. No.: 14/654,483

(22) PCT Filed: Feb. 14, 2014

(86) PCT No.: PCT/IB2014/000165
§ 371 (c)(1),
(2) Date: Jun. 19, 2015

(87) PCT Pub. No.: WO2014/097281
PCT Pub. Date: Jun. 26, 2014

(65) Prior Publication Data
US 2015/0342339 A1    Dec. 3, 2015

(30) Foreign Application Priority Data
Dec. 19, 2012    (GB) .................................. 1222924.1

(51) Int. Cl.
*A47B 13/00*    (2006.01)
*A47B 47/06*    (2006.01)
*F16B 12/46*    (2006.01)

(52) U.S. Cl.
CPC ............ *A47B 13/003* (2013.01); *A47B 13/00* (2013.01); *A47B 47/06* (2013.01); *F16B 12/46* (2013.01);
(Continued)

(58) Field of Classification Search
CPC .............. A47B 47/0008; A47B 96/205; A47B 2220/0086; A47B 2220/0083; A47C 5/005; F16B 12/44; F16B 12/12; B32B 3/04
See application file for complete search history.

(56) References Cited

U.S. PATENT DOCUMENTS 2,160,221 A * 5/1939 Masters ............... B65D 5/5033
                                                  156/207
2,821,761 A * 2/1958 Meyers ................... B65D 5/30
                                                  229/198.2

(Continued)

FOREIGN PATENT DOCUMENTS

DE         8812961 U1    12/1988
DE    202008000742 U1    3/2008
(Continued)

OTHER PUBLICATIONS

International Search Report issued in PCT/IB2014/000165 on Jun. 4, 2014.

*Primary Examiner* — Daniel Rohrhoff
(74) *Attorney, Agent, or Firm* — Mintz Levin Cohn Ferris Glovsky and Popeo, P.C.

(57) ABSTRACT

The invention provides an angled joint component for joining together components of a construction formed from cardboard. The joint is preferably folded from a single piece of cardboard and comprises a plurality of layers held in juxtaposition. The joint may be included in a desk formed from cardboard top and leg sub-assemblies.

17 Claims, 8 Drawing Sheets

(52) U.S. Cl.
CPC ..... *A47B 2220/0086* (2013.01); *Y10T 403/42* (2015.01)

(56) References Cited

U.S. PATENT DOCUMENTS

| | | | | | |
|---|---|---|---|---|---|
| 3,837,719 | A | * | 9/1974 | Barron | A47B 3/00 108/115 |
| 4,067,615 | A | * | 1/1978 | Gehry | A47B 13/02 297/451.8 |
| 4,365,454 | A | * | 12/1982 | Davis | A47B 96/205 446/109 |
| 4,902,164 | A | * | 2/1990 | Sauder | E06B 3/9682 403/294 |
| 5,370,064 | A | * | 12/1994 | Sgabellone | A47B 3/00 108/157.14 |
| 5,536,108 | A | * | 7/1996 | Kvalheim | E06B 3/984 108/180 |
| 5,660,119 | A | * | 8/1997 | Perkins | B65D 19/0012 108/51.3 |
| 7,347,326 | B2 | * | 3/2008 | Baechle | B65D 5/009 206/453 |
| 7,744,160 | B2 | * | 6/2010 | Stolarov | A47B 96/202 108/157.14 |
| 8,001,910 | B2 | * | 8/2011 | Yee | A47B 13/08 108/157.15 |
| 2006/0214493 | A1 | * | 9/2006 | Yee | A47B 13/04 297/445.1 |
| 2008/0157582 | A1 | * | 7/2008 | Bertele | A47B 43/02 297/440.12 |
| 2010/0181881 | A1 | * | 7/2010 | Hsu | A47B 47/0008 312/257.1 |
| 2012/0064279 | A1 | * | 3/2012 | Henke | A47B 47/0008 428/80 |

FOREIGN PATENT DOCUMENTS

| | | |
|---|---|---|
| EP | 2537438 A1 | 12/2012 |
| FR | 2178448 A5 | 11/1973 |
| GB | 1020772 A | 2/1966 |

* cited by examiner

CARDBOARD CONSTRUCTION

CROSS-REFERENCE TO RELATED APPLICATIONS

This application is a U.S. National Phase Application of PCT application no. PCT/IB2014/000165 filed Feb. 14, 2014 and claiming priority to U.K. patent application no. 1222924.1, filed Dec. 19, 2012, the disclosures of which are incorporated by reference herein.

FIELD OF THE INVENTION

This invention relates to cardboard construction and, in particular, to a jointing system for use in cardboard construction. Such a joint may be used in, for example, furniture formed from cardboard but is not to be restricted thereto.

BACKGROUND TO THE INVENTION

Constructions formed from cardboard are well known and include a multitude of packaging applications and point of sale materials. There is now a trend to manufacture from cardboard constructions which are to be subject to relatively high working loads but which are also required to be aesthetically pleasing. Such constructions include furniture and one such example of an item of furniture is a desk.

One problem often encountered in cardboard construction is providing stable right-angled joints. Typically where, for example, a leg attaches to an underside of a surface, the surface must overlie the leg joint to a considerable extent to ensure the resulting connection is well supported against bending around the joint, and is stable. As a result, aesthetic and dimensional limitations may arise.

It is an object of the invention to provide a component for use in cardboard construction and/or an article including such a component which will go at least some way in addressing the aforementioned drawbacks; or which will at least provide a novel and useful choice.

SUMMARY OF THE INVENTION

Accordingly, in a first aspect of the invention, there is provided a joint component formed from cardboard wherein said joint component defines two arms arranged in a right angle or substantially in a right angle, said joint component being characterised in that it is composed of more than one juxtaposed layers folded from a single sheet of material.

Used herein, the term substantially may mean a small variation in angle from a right angle. Such a small variation may not substantially alter any rigidity of the joint component or may not materially alter any load that the joint component is able to bear.

Preferably said more than one juxtaposed layers are concertinaed.

Preferably an inner edge of said right angle includes a locking surface.

Preferably a retaining facility is provided to retain the layers in juxtaposition.

In a second aspect the invention comprises an article formed from cardboard, said article having two parts mounted at right angles to one another, one of said two parts having a first cavity to receive one arm of a joint component according to the first aspect of the invention, and the other of said two parts having a second cavity to receive the other of the arms of said joint component.

Preferably said first and/or said second cavity includes a second locking surface to engage a locking surface on said joint component.

Preferably said second locking surface is provided by a flap formed integrally with a wall surface defining said cavity.

Preferably said article comprises a desk having a desk top supported on spaced leg components wherein said desk top and each of said leg components include cavities to receive respective arms of a plurality of joint components as set forth above.

Preferably said joint components, said desk top and said leg components are constructed and arranged such that outer surfaces of said leg components are arranged to substantially coincide with spaced edges of said desk top.

Preferably said desk top, each of said leg components and said joint components have complimentary interlocking edges.

Many variations in the way the invention may be performed will present themselves to those skilled in the art, upon reading the following description. The description should not be regarded as limiting but rather as an illustration, only, of one manner of performing the invention. Where appropriate any element or component should be taken as including any or all equivalents thereof whether or not specifically mentioned.

BRIEF DESCRIPTION OF THE DRAWINGS

One working embodiment of the invention will now be described with reference to the accompanying drawings in which.

DETAILED DESCRIPTION OF WORKING EMBODIMENT

The present invention provides novel components, themselves made of cardboard, to enable the assembly of a range of cardboard constructions. Such constructions include, but are not to be limited to, furniture items. One example of a furniture item, in the form of a desk, will be described in greater detail below.

Typically cardboard constructions, and particularly furniture, will include components arranged at right angles. In one aspect of the invention, a joint is provided to allow components to be securely joined at right angles in a simple and effective manner. As will become apparent from the following, the joint has the added advantage of being structurally strong thus avoiding the need to build additional strength into the components, in the vicinity of the joints, in order to provide the necessary strength.

Figure 4:
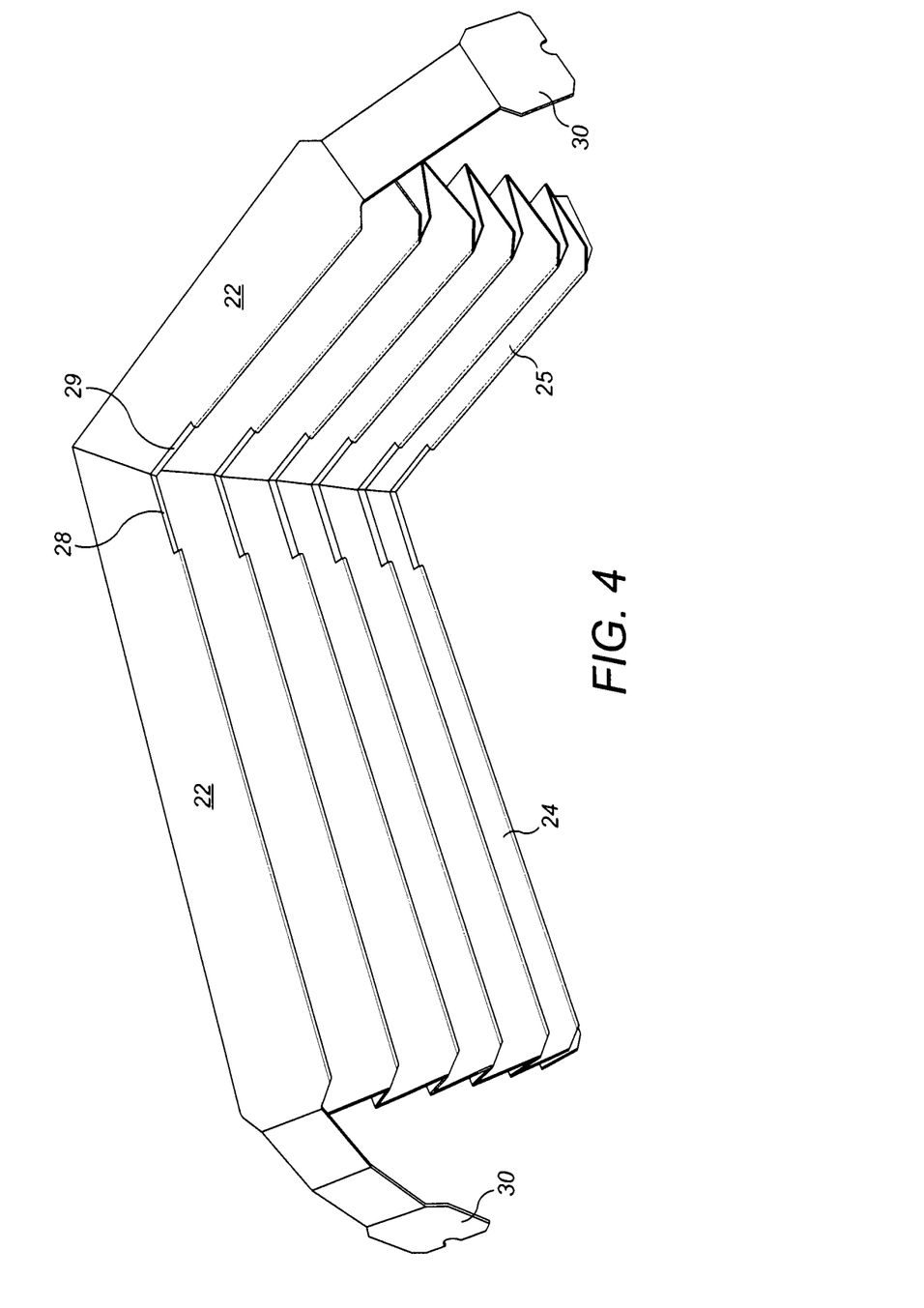
Figure 5:
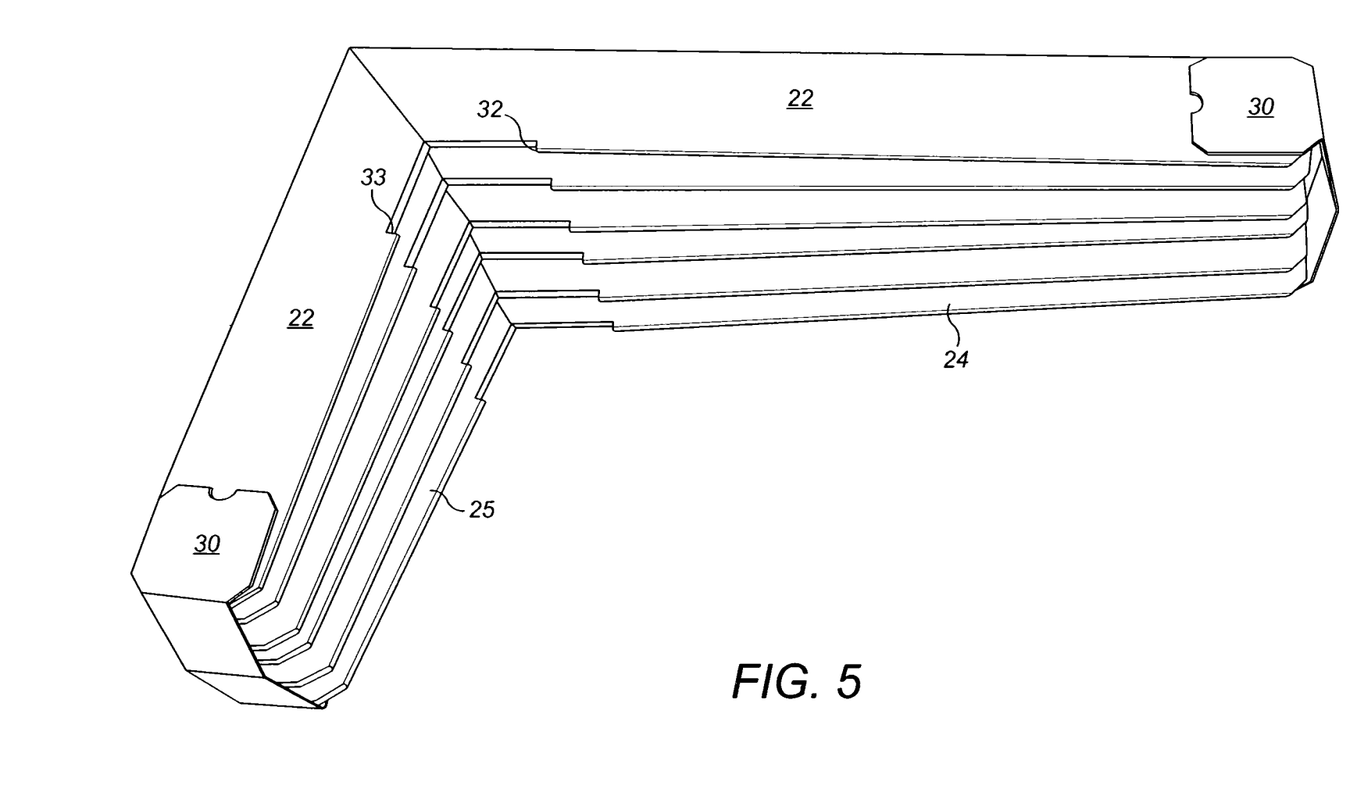
Figure 6:
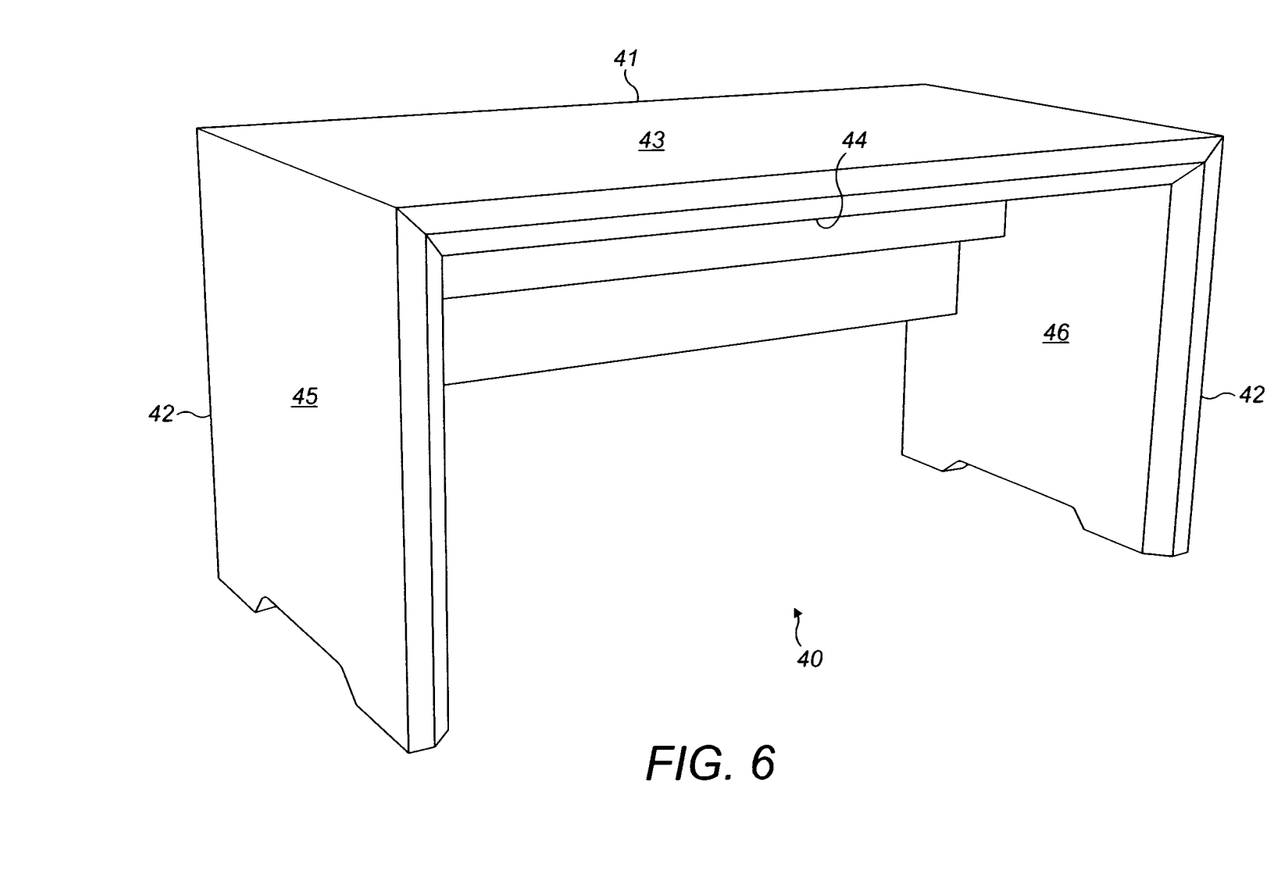
FIG. 6: shows an isometric view of a desk formed according to the invention.
Figure 8:
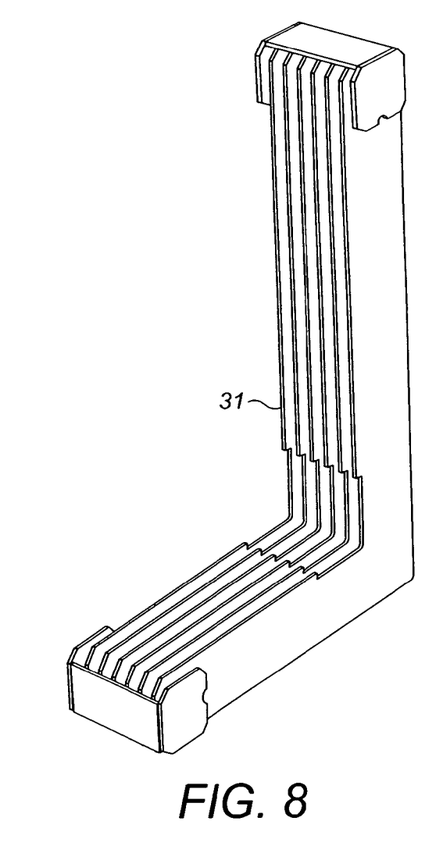
FIG. 8: shows, in a larger scale, a joint component included in the desk shown in FIG. 7.

The completed joint components are shown in FIGS. 5 & 8 and the construction thereof will now be described with reference to FIGS. 1 to 5.

Figure 1:
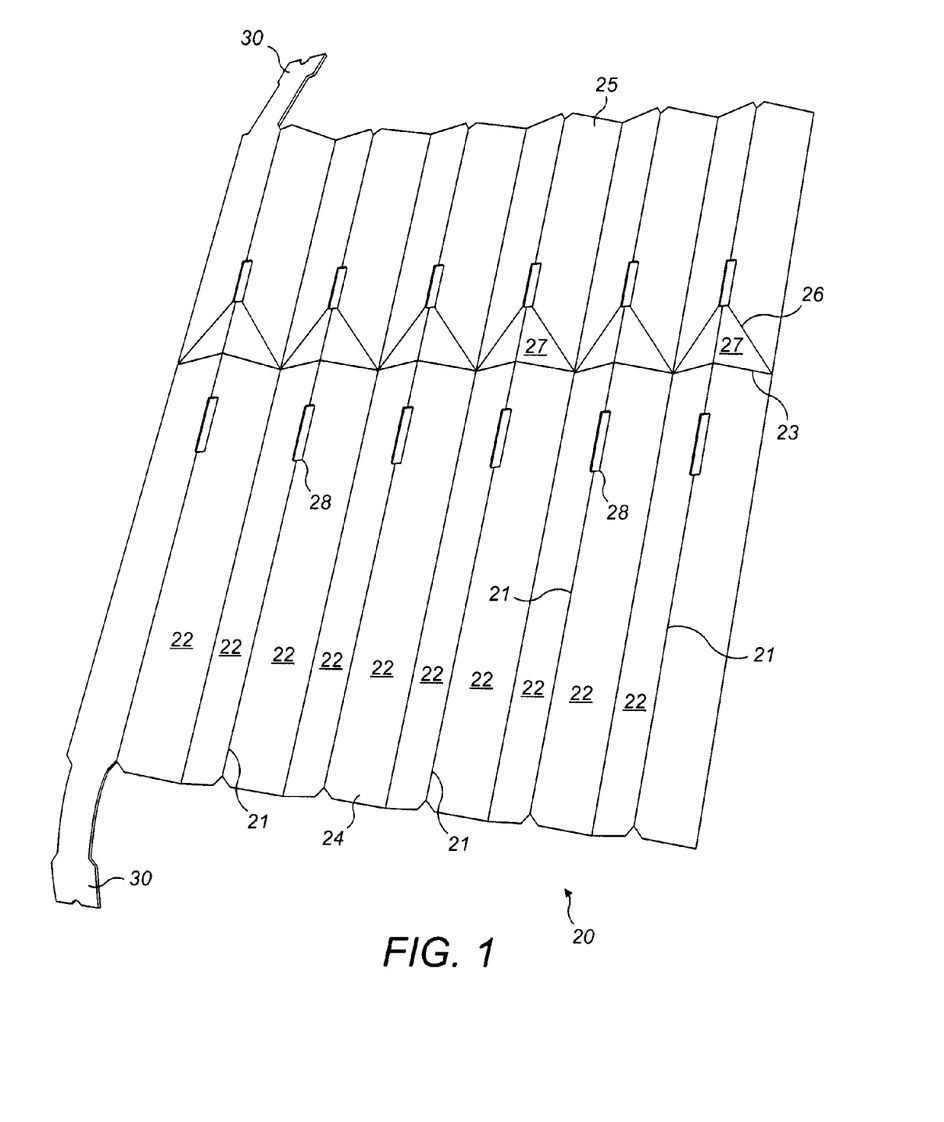
FIGS. 1 to 5: show a sequence of steps in forming a joint component according to the invention.

Referring firstly to FIG. 1, a rectangular base 20 of fluted cardboard is provided, along the length of which is provided parallel score or folding lines 21 to define strips 22 of equal width. A transverse score line 23 is also provided which divides the base 20 into sections 24 and 25. Angled score lines 26 extend from the junctions between the lines 21 and the line 23 and converge in pairs to define triangular sections 27. Sets 28 and 29 of rectangular slots are provided on alternative score lines 21, on opposite sides of the transverse score line 23. It will be noted that the score lines 26, that define the triangular sections 27, extend from the junctions between lines 21 and 23, to the slots 29.

As a first step the cardboard base 20 is folded about score lines 21, alternate folds being in opposite directions so that the strips 22 are concertinaed and the slots in each of the sets 28 and 29 lie in substantially common planes. With the base 20 pre-folded along lines 21 to establish the concertinaed arrangement, the base is then allowed to relax to assume the spread format as shown in FIG. 1. In this configuration the concertinas are started but contribute little resistance to bending.

Figure 2:
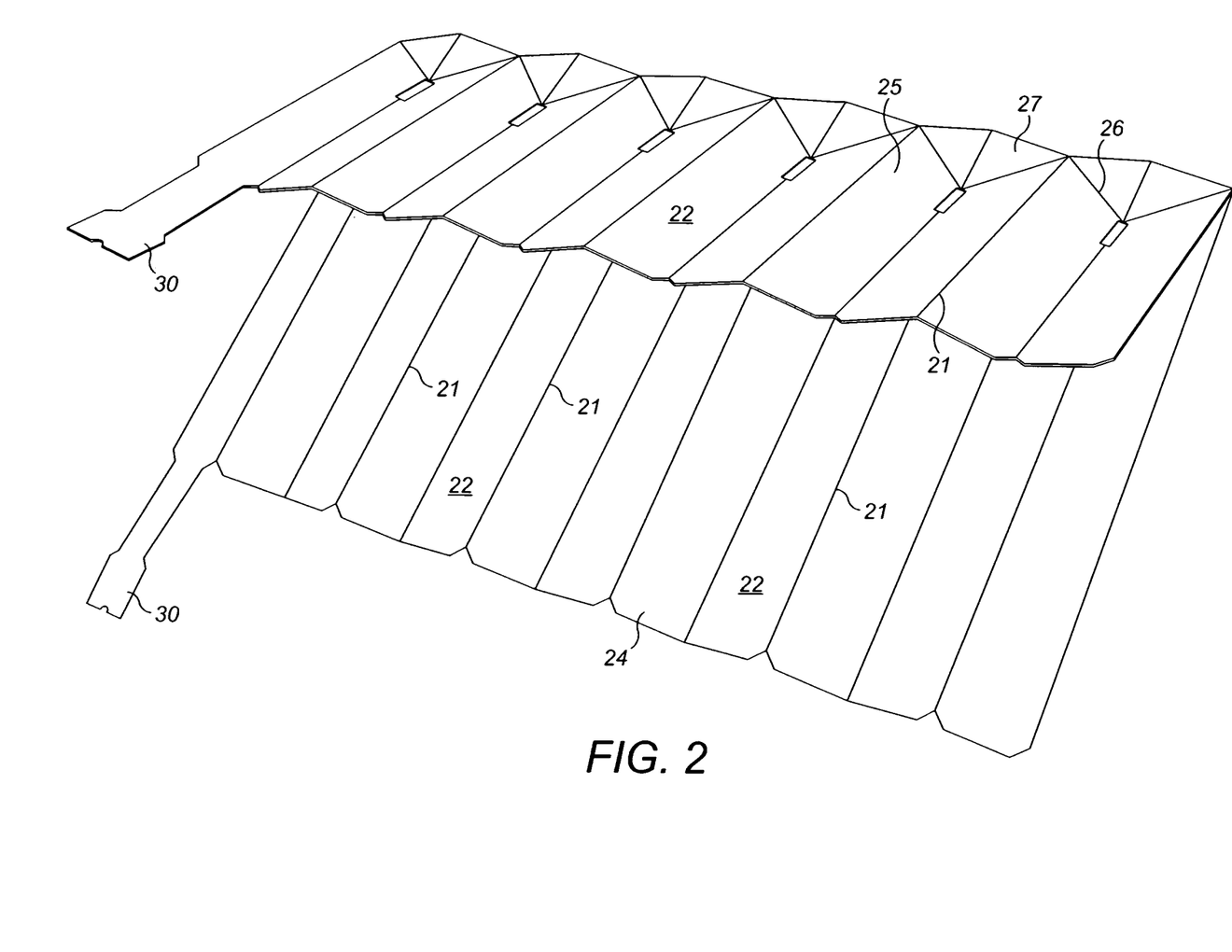

As a second step the base is folded about transverse line 23 so assuming the form shown in FIG. 2. In the position shown in FIG. 2 the triangular sections 27 are folded about the transverse line 23 and take up contact against the section 24 of the base. The remainder of the part 25 is angled away from the part 24 of the base.

Figure 3:
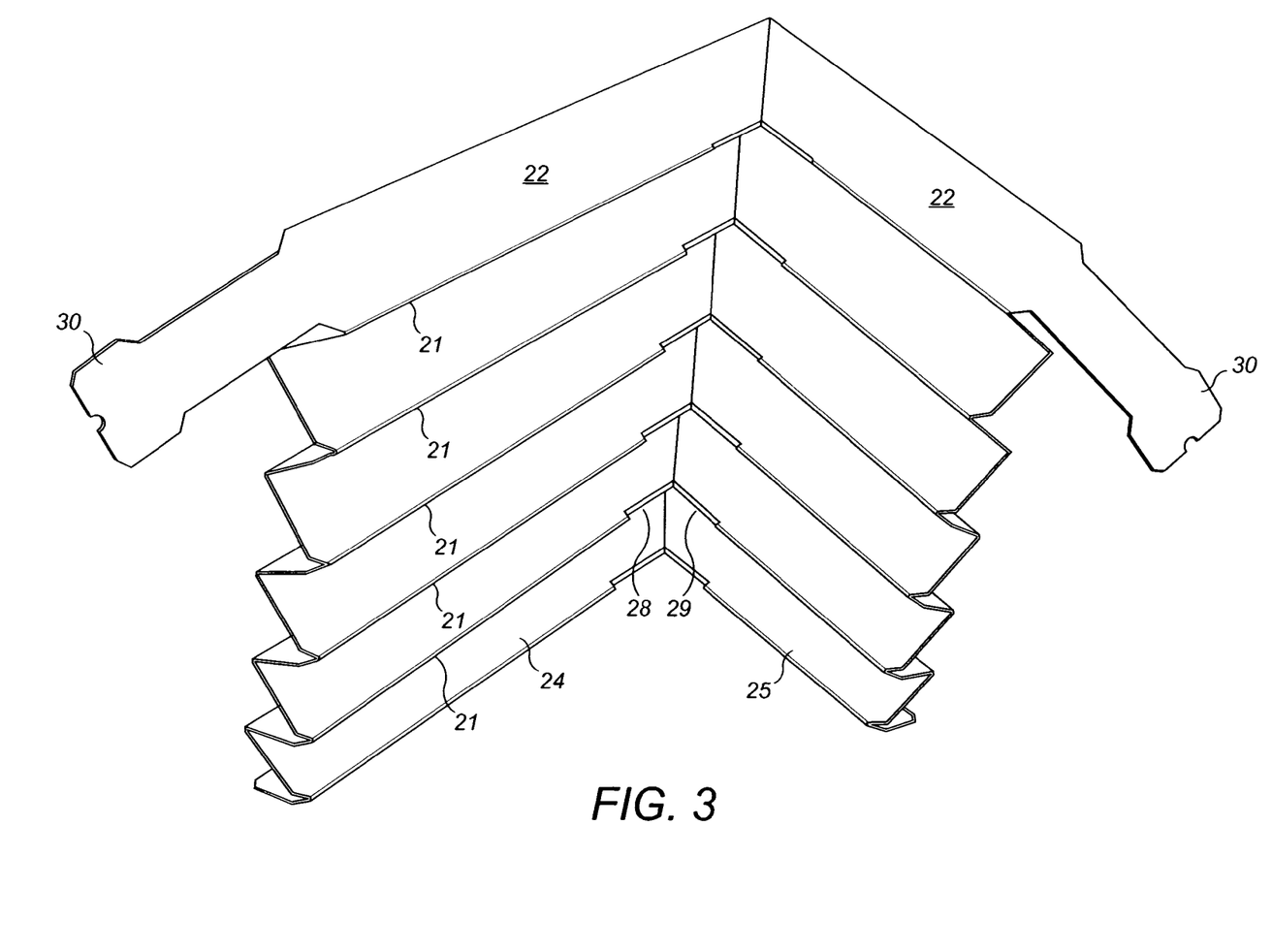

In the third step, as shown in FIGS. 3 & 4, the folded arrangement shown in FIG. 2 is compressed laterally i.e. in the direction of the transverse line 23 and so as to close up the concertinas. As this action continues two arms are defined at right angles to one another, each arm comprising juxtaposed layers formed from the strips 22. The length of one arm corresponds to the length of section 24 whilst the length of the other arm corresponds to the length of the section 25.

In FIG. 5 a retaining facility is shown securing the joint in its concertinaed configuration. In the example shown, this facility comprises fixing tabs 30, which are integrally formed with one of the strips 22 defining an edge of the base 20, and which are fixed to the opposite edge to maintain the concertinaed configuration.

It will be appreciated that, with the concertinas laterally compressed as shown in FIG. 5, the triangular sections 27 are firmly compressed together thus preventing opening of the angle. Thus an extremely strong joint component 31 is provided.

FIG. 5 also illustrates how the slots 28 and 29 combine, when the joint is formed, to provide locking edges 32 and 33, the function of which will be described in greater detail below.

The joint component 31 as above described may be formed from NE 150K/150T fluted cardboard although other applications may dictate different grades of board.

Referring now to FIGS. 6 to 10, a item of furniture in the form of desk 40 is shown, the desk being formed using a plurality of the jointing components described above. Whilst the desk is shown in its normal operating configuration in FIG. 6, it will be apparent from FIGS. 9 & 10 that assembly of the desk is undertaken with the desktop inverted and resting on a flat surface.

Figure 7:
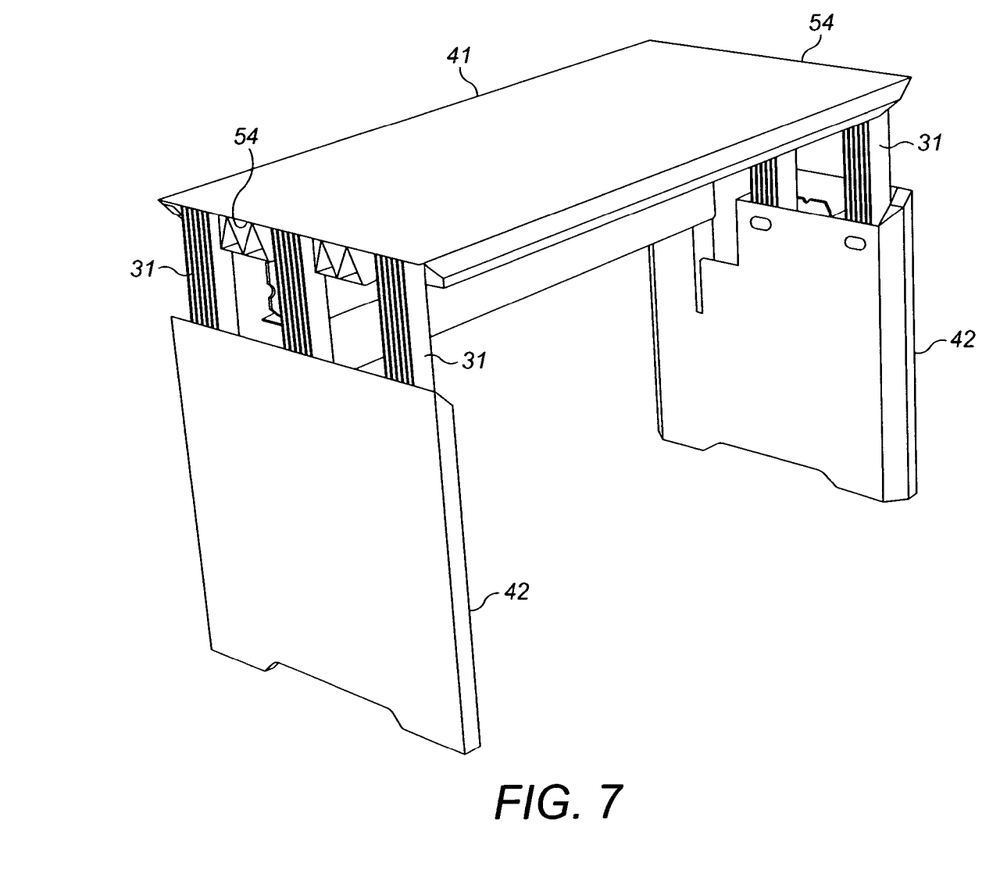
FIG. 7: shows the desk of FIG. 6 partially exploded to illustrate the principal components thereof.

In the form shown the desk includes a desktop 41 and two spaced legs 42. The desktop 41 has an upper surface 43 and an under surface 44. Each leg 42 has an outer surface 45 and an inner surface 46. The joint component 31 is shown diagrammatically in FIG. 8 and, as can be seen in FIG. 7, three joint components are used to mount each leg 42 to the desktop 41. Preferably the shorter arm of the joint component is inserted into the desktop.

Figure 9:
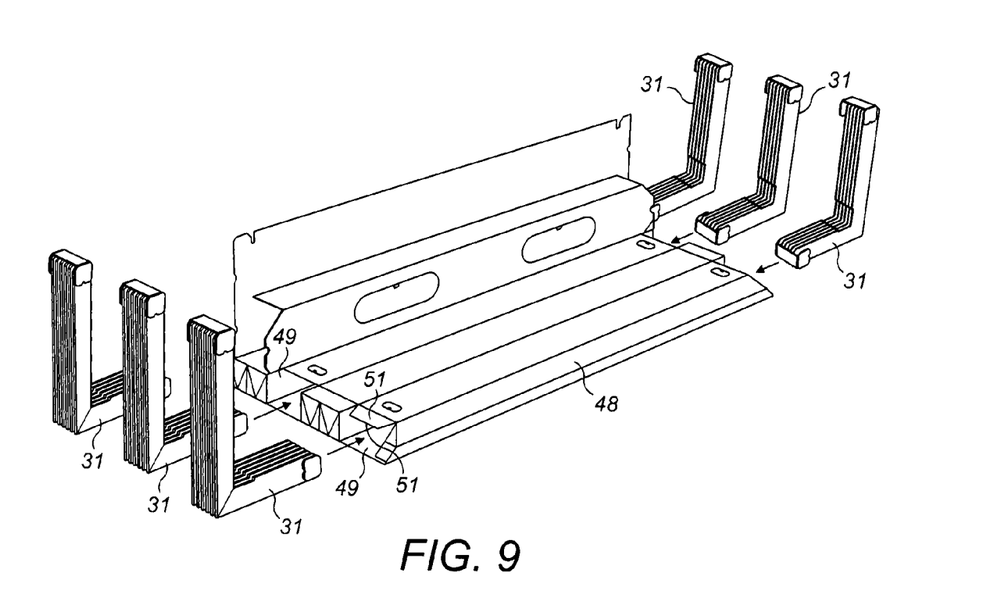
FIGS. 9 & 10: show, with the desk inverted, two earlier steps in the formation of the desk shown in FIGS. 6 to 8.
Figure 10:
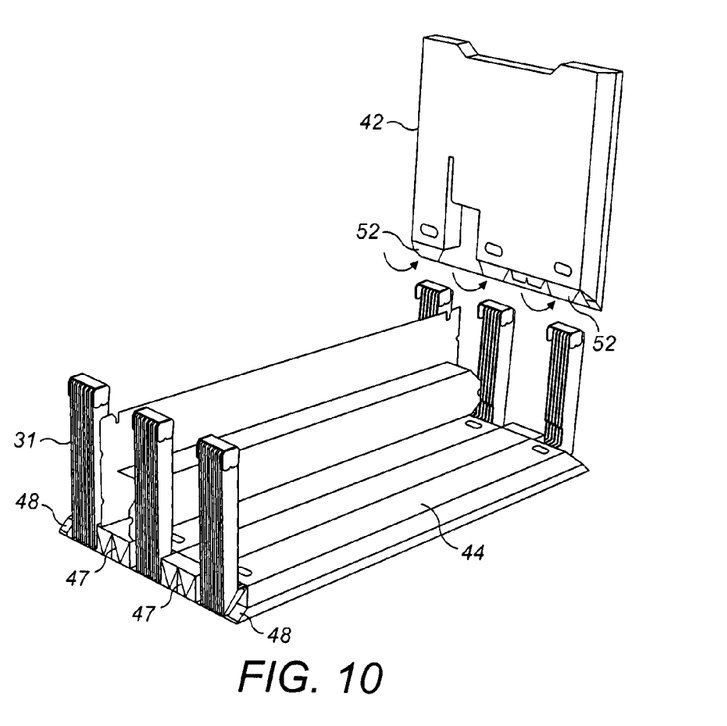

As will be apparent from FIGS. 7, 9 & 10, the desktop and each of the legs are preferably sub-assemblies folded from sheet cardboard. In the assembly comprising the desktop two longitudinally extending girders 47 add bending strength to the assembly and, in combination with edges 48, define three longitudinally extending cavities 49. As is apparent from the Figs each of these cavities receives one arm of a joint component 31. On those parts of the under surface 44 that overlie the ends of the cavities 49, locking flaps 50 are formed, one such flap being shown in FIG. 9. Prior to insertion of the locking components 31 into the cavities, these flaps 50 are folded under and into the cavity whereupon the outer edge 51 of the flap 50 defines a locking edge to engage locking edge 33 on the joint component 31.

Similarly within the leg assemblies 42, three spaced cavities are defined to receive the arms of the joint components extending from the desktop. Further locking flaps 52 are provided on the inner surfaces 46 of the leg assemblies and these are folded inwards in the direction shown in the arrows in FIG. 10. As the leg assemblies are displaced down and over the joint components, the locking edges 32 on the joint components engage with the ends of flaps 52 to lock the legs to the desktop.

In the desk shown in the drawings both the ends of the desktop, and the mating upper ends of in the leg assemblies, are mitred. This allows the side edges 54 of the desk to lie substantially in the planes of the outer surfaces 45 of the legs and provides for an aesthetically pleasing desk. Such a construction would not be possible but for the invention disclosed herein.

The invention claimed is:

1. A joint component formed from cardboard wherein the joint component defines two arms arranged in a right angle or substantially in a right angle, wherein the joint component is composed of more than one juxtaposed layers folded from a single sheet of material in a concertinaed configuration comprising alternate folds in opposite directions.

2. A joint component as in claim 1 wherein the more than one juxtaposed layers are concertinaed.

3. A joint component as in claim 1 wherein an inner edge of the right angle, or substantial right angle, includes a locking surface.

4. A joint component as in claim 3, wherein the locking surface comprises slots.

5. A joint component as in claim 1 wherein a retaining facility is provided to retain the layers in juxtaposition.

6. A joint component as in claim 5, wherein the retaining facility comprises a fixing tab on each arm.

7. A joint component as in claim 6, wherein the fixing tabs are integrally formed with their respective arms.

8. A joint component as in claim 1, wherein an inner edge of the right angle or substantial right angle comprises compressed triangular sections.

9. A joint component as in claim 8, wherein an inner edge of the right angle or substantial right angle includes a locking surface comprising slots, the triangular sections extending between the inner edge and the slots.

10. An article formed from cardboard, the article having two parts mounted substantially at right angles to one another, one of the two parts having a first cavity to receive one arm of a joint component as claimed in claim 1, and the other of the two parts having a second cavity to receive the other of the arms of the joint component, the joint component composed of more than one juxtaposed layers folded from a single sheet of material in a concertinaed configuration comprising alternate folds in opposite directions.

11. An article as in claim 10, wherein at least one of the first and the second cavities includes a second locking surface to engage a locking surface on the joint component.

12. An article as in claim 11 wherein the second locking surface comprises a flap formed integrally with a wall surface defining the cavity.

13. An article as in claim 10 comprising a desk having a desk top supported on spaced leg components wherein the desk top and each of the leg components include cavities to receive respective arms of a plurality of joint components.

14. An article as in claim 13 wherein the joint components, the desk top and the leg components are constructed and arranged such that outer surfaces of the leg components are arranged to substantially coincide with spaced edges of the desk top.

15. An article as in claim 14, wherein the coinciding edges are mitred.

16. An article as in claim 13 wherein the desk top, each of the leg components and the joint components have complimentary interlocking edges.

17. An article formed from cardboard, the article having two parts mounted substantially at right angles to one another, one of the two parts having a first cavity to receive one arm of a joint component, and the other of the two parts having a second cavity to receive the other of the arms of the joint component, wherein one of the first and the second cavities includes a second locking surface to engage a locking surface on the joint component, the joint component being formed from cardboard and defining two arms arranged in a right angle or substantially in a right angle, the joint component being composed of more than one juxtaposed layers folded from a single sheet of material in a concertinaed configuration comprising alternate folds in opposite directions.

\* \* \* \* \*